United States Patent [19]

Augsburger et al.

[11] Patent Number: 4,536,302

[45] Date of Patent: Aug. 20, 1985

[54] CORROSION INHIBITION OF AQUEOUS BRINES

[76] Inventors: John J. Augsburger, 128 Pamellia, Bellaire; R. Keith Darlington, 719 Oder La., Houston, both of Tex.

[21] Appl. No.: 509,717

[22] Filed: Jun. 30, 1983

[51] Int. Cl.³ .................. E21B 41/02; C09K 3/00; C23F 11/04

[52] U.S. Cl. .................. 252/8.55 R; 252/8.55 E; 252/391; 252/395; 422/12

[58] Field of Search ............ 252/8.55 E, 8.55 R, 252/8.5 B, 146, 148, 149, 391, 395, 396; 422/12, 14, 7; 166/244 C, 244 R

[56] References Cited

U.S. PATENT DOCUMENTS

| | | | |
|---|---|---|---|
| 2,073,413 | 3/1937 | Cross et al. | 252/8.5 B |
| 3,634,270 | 1/1972 | Engle et al. | 252/149 |
| 3,909,200 | 9/1975 | Redmore | 252/8.55 E |
| 3,909,447 | 9/1975 | Redmore et al. | 252/8.55 E |
| 4,014,715 | 3/1977 | Preston | 252/149 |
| 4,087,371 | 5/1978 | Lowicki et al. | 422/14 |
| 4,292,183 | 9/1981 | Sanders | 252/8.55 R |
| 4,450,137 | 5/1984 | Thompson et al. | 422/12 |
| 4,450,138 | 5/1984 | Thompson et al. | 422/12 |

FOREIGN PATENT DOCUMENTS 2027686 2/1980 United Kingdom ........... 252/8.55 R

OTHER PUBLICATIONS

Hudgins et al., 1961, Heavy Brine Makes Good Fluid for Completion Packer, The Oil and Gas Journal, pp. 91–96.

Primary Examiner—Stephen J. Lechert, Jr.
Assistant Examiner—Howard J. Locker
Attorney, Agent, or Firm—Browning, Bushman, Zamecki & Anderson

[57] ABSTRACT

A method and composition for reducing the corrosion effect of aqueous mediums such as brines on ferrous metals by incorporating in the brine an effective amount of a mixture of a sulfur compound wherein the oxidation state of the sulfur is zero or less and a reducing sugar.

14 Claims, No Drawings

CORROSION INHIBITION OF AQUEOUS BRINES

BACKGROUND OF THE INVENTION

The present invention relates to methods and compositions for inhibiting the corrosion of ferrous metals by aqueous mediums, particularly brines. More particularly, the present invention is related to reducing the corrosion of iron and steel casing, tubing and other ferrous, subterranean well structural parts exposed to brines used as completion, workover, packer fluids and other well servicing fluids.

In well servicing operations, clear, solids free completion, workover and packer fluids, e.g. brines, are utilized for various purposes, especially where a relative dense fluid is desired. While alkali metal salt brines may be employed in such applications, it is more common to employ brines of salts such as calcium chloride, calcium bromide, zinc chloride, zinc bromide, etc. because they provide well servicing fluids of greater specific gravity. It is well known that such brines are corrosive to ferrous metal goods in the well bore even in the absence of substantial oxygen. The problem is further accentuated by the fact that well bore temperatures commonly exceed 120° C., increasing the rate of corrosion. A particular problem regarding the corrosiveness of such brines occurs when they are used as packer fluids in which case they remain substantially static in the well bore and in continuous, relatively long duration contact with subterraneous ferrous metal well components.

British Pat. No. 2,027,686 discloses a method of inhibiting the corrosion of ferrous metals exposed to aqueous brines by including in the brine an effective amount of a sulfur compound wherein the oxidation state of the sulfur is zero or less, a particularly preferred sulfur compound being ammonium thiocyanate.

SUMMARY OF THE INVENTION

It is therefore an object of the present invention to provide an improved method for inhibiting corrosion of ferrous metals exposed to corrosive aqueous mediums such as brines.

Another object of the present invention is to provide a substantially clear, solids free well servicing fluid of reduced corrosiveness to ferrous metals.

The above and other objects of the present invention will become apparent from the description given herein and the appended claims.

The present invention is based on the discovery that the corrosiveness of aqueous mediums such as brines on ferrous metals can be reduced by including in the brine an effective amount of a mixture of a sulfur compound wherein the oxidation state of the sulfur is 0 or less and an effective amount of a reducing sugar, the sulfur compound and the sugar being uniformly dispersible in, and preferably soluble in, the brine.

DESCRIPTION OF THE PREFERRED EMBODIMENTS

The sulfur compounds useful in the present invention are preferably water soluble thio compounds, e.g. a thiocyanate such as an alkali metal thiocyanate or, most preferably, sodium or ammonium thiocyanate. The sulfur compound can also be an organic thioamide and essentially any such compound is operable. The thioamides include compounds such as thiourea, polythioureas, a hydrocarbon substituted derivative thereof, or a thioamide having the formula:

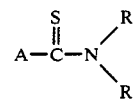

wherein A is a hydrocarbon radical of 1-12 carbon atoms or a pyridyl radical, and each R is a hydrogen atom or an alkyl radical of 1-8 carbon atoms. Thioamides such as thiourea, 1,2-diethylthiourea, propylthiourea, 1,1-diphenylthiourea, thiocarbanilide, 1,2-dibutylthiourea, dithiourea thioacetamide, thionicotimide, or thiobenzamide are representative of this class. Water soluble sulfides such as ammonium sulfide, an alkali metal sulfide, or corresponding hydrosulfides including $H_2S$ are other operable thio compounds. Elemental sulfur which is dispersible in the brines is also operable although the above mentioned soluble thio compounds are preferred.

While virtually any significant quantity of the sulfur compound, in combination with reducing sugar, will provide an enhanced degree of inhibition of corrosion, it is preferable that the sulfur compound be present in an amount of at least about 1.0 grams per liter of the well servicing fluids or brine solution to provide practical protection. While concentrations as high as 20 grams of the sulfur compound per liter can be employed without any deleterious effects, generally amounts in excess of 10 grams of the sulfur compound per liter of the well servicing fluid provide little or no additional protection. Accordingly, it is preferred that the upper level of the sulfur compound be about 10 grams per liter. Most preferably, the total concentration of the sulfur compound in the corrosion reducing mixture of the present invention will range from about 4 to about 10 grams per liter of the well servicing fluid.

The other ingredient of the corrosion reducing mixture of the present invention comprises a reducing sugar. The term reducing sugar, as used herein, refers to a monosaccharide, a disaccharide, a oligosaccharide or mixture thereof which exhibits a positive tests with Fehlings solution. The term oligosaccharide, while generally inclusive of disaccharides, as used herein is intended to refer to carbohydrates of known molecular weight and made up of a number of monosaccharide units ranging from about 3 to about 10. Non-limiting examples of monosaccharides, all of which are reducing, include glucose, fructose, lactose, mannose, arabinose, xylose, etc. Non-limiting examples of disaccharides include lactose, maltose, cellobiose, etc. As noted above, the oligosaccharides which are useful in the corrosion reducing mixture of the present invention are polysaccharides made up from 3 to about 10 monosaccharide units. Such oligosaccharides can be obtained, for example, by the interrupted hydrolysis of cellulose in various well known procedures. While the reducing sugar in the corrosion reducing mixture of the present invention can be present in a substantially pure form such as glucose, maltose, etc., it is convenient, for practical as well as economic purposes, to employ sources such as molasses obtained from sugar cane or sugar beet or other similar syrups which are naturally occurring, readily available, inexpensive and which contain significant amounts of one or more reducing sugars.

Generally speaking the reducing sugar will be present in an amount of at least about 1 gram per liter of the well servicing fluid or brine, most preferably in an amount of from about 2 to about 10 grams per liter of the well servicing fluid. As noted above, it has been found that when the sulfur compound and the reducing sugar are employed together, enhanced resistance to corrosion of ferrous metals exposed to brines is achieved. Accordingly, it is only necessary to incorporate that amount of reducing sugar which will provide maximum enhancement of the corrosion resistance, larger amounts of the sugar providing no beneficial effect.

The aqueous brines which are contemplated by the present invention include aqueous solutions of the alkali metal halides such as sodium chloride, potassium chloride, sodium bromide, etc.; however, the aqueous solutions which are of greatest interest are the so-called heavy brines or brines which contain at least one polyvalent metal halide salt such as calcium chloride, bromide or iodide, zinc chloride, bromide or iodide, or a mixture of such salts. Such heavy brines are commonly used in oil field applications as well as in other industries. For example, such brines may be used in separation processes wherein substances of different densities are separated by flotation. It will be recognized that in the case of well servicing fluids, the brines can contain various functional additives such as fluid loss additives, gelling agent, friction reducers, surfactants, etc. The brine solutions which may be inhibited according to the present invention also include aqueous organic acid solutions weighted with a suitable metal halide salt to increase the specific gravity thereof. The present invention finds excellent application in brines which are used as packer fluids. As is well known, such fluids are commonly retained in the well bore, in a static condition, for relatively long periods of time and, accordingly, the corrosion rate of down-hole ferrous metal components exposed to such packer fluids can become relatively rapid.

The corrosion inhibitor mixture of the present invention has been found to have good inhibitive properties even at elevated temperatures where the corrosion caused by heavy brines would otherwise become relatively serious. As is well known, such elevated temperatures are commonly encountered in downhole environments and such elevated temperatures combined with long contact times make it imperative that the well servicing fluids be effectively inhibited.

To more fully illustrate the present invention, the following non-limiting examples are presented. In determining the corrosion rate shown in the following examples, the following procedure was employed: mild steel corrosion coupons, free of rust, were rinsed in acetone and dried, care being taken to avoid human contact of the coupons. The coupons were weighed to the nearest 0.1 milligram. Two coupons were placed into a glass container containing 250 ml of the test fluid to thereby provide a volume to surface area ratio of 19.5 ml/sq. in. The glass container containing the coupons and the test fluid was then placed into an aging cell and pressurized to the desired pressure with an inert medium such as $N_2$. The cell was then placed in an oven at the desired temperature for the required test period. Following aging, the coupons were removed from the test fluid and immersed in a 15% hydrochloric acid solution inhibited with a suitable corrosion inhibitor such as for example COAT 272 (Trademark of a corrosion inhibitor marketed by NL TREATING CHEMICALS, Houston, Tex.). The coupons were then scrubbed and rinsed sequentially in hot water, isopropanol and acetone. They were then dried, following which they were reweighed, again to the nearest 0.1 milligram. The corrosion rate for each coupon is calculated as follows:

$$C.R.\ (mpy) = \frac{(534)(1000)(W.L.)}{(SpGr.)(S.A.)(T)}$$

where
W.L. = Weight Loss in grams
SpGr. = Specific Gravity of coupon
S.A. = Surface Area of coupon
T = Time in hours
mpy = Mils per year

EXAMPLE 1

The above described general procedure was employed with a 18 ppg (pounds per gallon) brine made from $CaBr_2/ZnBr_2$. In all cases, the sulfur compound used was sodium thiocyanate. The results, using various reducing sugars or varying temperatures and length of time are shown in Table 1 below.

TABLE 1

| g/l NaSCN | g/l Sugar | Test Temp, °C. | Test Length, Days | Corrosion Rate, mpy |
|---|---|---|---|---|
| 0 | 0 | 177 | 7 | 52.9 |
| 0 | 2.2* | | | 42.9 |
| 2.2 | 0 | | | 7 |
| 2.2 | 2.2 | | | 5.3 |
| 0 | 0 | | 8 | 46.4 |
| 2.2 | 0 | | | 6.5 |
| 2.2 | 5.4 | | | 3.3 |
| 0 | 0 | | 7 | 57.2 |
| 2.2 | 0 | | | 6.3 |
| 0 | 2.2 Lactose | | | 31.7 |
| 2.2 | 2.2 Lactose | | | 5.8 |
| .0 | 2.2 Maltose | | | 28.9 |
| 2.2 | 2.2 Maltose | | | 4.3 |
| 0 | 0 | | | 40.3 |
| 2.2 | 0 | | | 6.0 |
| 0 | 4.3 | | | 29.7 |
| 1.1 | 2.2 | | | 3.2 |
| 0 | 0 | 204 | 7 | 53.4 |
| 0 | 2.2 | | | 43.2 |
| 2.2 | 0 | | | 11.0 |
| 2.2 | 2.2 | | | 8.7 |
| 0 | 0 | 177 | 7 | 40.3 |
| 0 | 4.3 | | | 29.7 |
| 4.3 | 0 | | | 6.0 |
| 2.2 | 2.2 | | | 5.7 |

*Molasses where sugar not identified.

EXAMPLE 2

The corrosion test procedure described above was utilized in testing the effectiveness of the sulfur/reducing sugar mixture of the present invention on brines of various density and composition. In all cases the reducing sugar comprised molasses while the sulfur compound was sodium thiocyanate. The tests were conducted at 177° C. at a pressure of 500 psi $N_2$. The results are shown in Table 2 below.

TABLE 2

| Brine | g/l Molasses | g/l NaSCN | Corrosion Rate, mpy |
|---|---|---|---|
| 16.0 ppg $CaBr_2/ZnBr_2$ | 0 | 0 | 14.1 |
| | 1.9 | 0 | 15.1 |
| | 1.9 | 1.9 | 3.2 |
| | 0 | 1.9 | 3.1 |
| | 4.8 | 0 | 11.2 |

TABLE 2-continued

| Brine | g/l Molasses | g/l NaSCN | Corrosion Rate, mpy |
|---|---|---|---|
| | 4.8 | 1.9 | 2.7 |
| 18.0 ppg. CaBr$_2$/ZnBr$_2$ | 0 | 0 | 64.2 |
| | 2.2 | 0 | 48.2 |
| | 2.2 | 2.2 | 9.6 |
| | 0 | 2.2 | 10.3 |
| | 5.4 | 0 | 36.0 |
| | 5.4 | 2.2 | 8.8 |
| 19.2 ppg CaBr$_2$/ZnBr$_2$ | 0 | 0 | 95.7 |
| | 2.3 | 0 | 75.2 |
| | 2.3 | 2.3 | 63.7 |
| | 0 | 2.3 | 81.1 |
| | 5.8 | 0 | 75.5 |
| | 5.8 | 2.3 | 51.3 |

As can be seen from the data above, using a mixture of certain sulfur compounds and a reducing sugar, the corrosiveness of brines, particularly heavy brines, exposed to ferrous metals can be significantly reduced. As can also be seen, while certain sulfur compounds alone function to reduce the corrosive nature of the brine or well servicing fluid, greatly enhanced effects are achieved when a mixture of the sulfur compound and a reducing sugar are employed.

The invention may be embodied in other specific forms without departing from the spirit or essential characteristics thereof. The foregoing embodiments are therefore to be considered, in all respects, as illustrative and not restrictive, the scope of the invention being indicated by the appended claims rather than by the foregoing description, and all changes which come within the meaning and range of equivalence of the claims are therefore intended to be embraced therein.

What is claimed is:

1. A method of reducing the corrosive affect of aqueous brine or ferrous metal surfaces exposed to said brine comprising adding to the brine a corrosion inhibiting quantity of a mixture of (1) a sulfur compound wherein the oxidation state of the sulfur is zero or less, said sulfur compound being employed in an amount of at least about 1.0 grams per liter of brine, and (2) a reducing sugar, said reducing sugar being employed in an amount of at least 1.0 grams per liter of brine, said mixture being generally uniformly dispersed in said brine.

2. The method of claim 1 wherein the sulfur compound is a water soluble thiocyanate or a thioamide.

3. The method of claim 1 wherein the sulfur compound is selected from the group consisting of alkali metal thiocyanates, ammonium thiocyanate, thiourea and mixtures thereof.

4. The method of claim 3 wherein said sulfur compound comprises ammonium thiocyanate.

5. The method of claim 1 wherein said sugar comprises a disaccharide.

6. The method of claim 1 wherein said sugar comprises an oligosaccharide having from 3 to 10 monosaccharide units.

7. A well servicing fluid comprising an aqueous medium and a corrosion inhibiting amount of a mixture of (1) a sulfur compound wherein the oxidation state of the sulfur is zero or less, said sulfur compound being employed in an amount of at least 1.0 grams per liter of said aqueous medium, and (2) a reducing sugar, said sugar being employed in an amount of at least 1.0 grams per liter of said aqueous medium, said mixture being generally uniformly dispersed in said aqueous medium.

8. The well fluid of claim 7 wherein said sulfur compound is a water soluble thiocyanate or thioamide.

9. The well fluid of claim 7 wherein said sulfur compound is selected from the class consisting of alkali metal thiocyanates, ammonium thiocyanate, thiourea and mixtures thereof.

10. The well fluid of claim 9 wherein said sulfur compound comprises ammonium thiocyanate.

11. The well fluid of claim 7 wherein said sugar comprises a disaccharide.

12. The well fluid of claim 7 wherein said sugar comprises an oligosaccharide having from 3 to 10 monosaccharide units.

13. The well fluid of claim 7 wherein said aqueous medium comprises a brine containing a halide salt of a divalent metal cation.

14. The well fluid of claim 13 wherein said aqueous medium comprises a brine of at least one of calcium chloride, calcium bromide, calcium iodide, zinc chloride, zinc bromide and zinc iodide.

* * * * *

UNITED STATES PATENT AND TRADEMARK OFFICE
CERTIFICATE OF CORRECTION

PATENT NO. : 4,536,302
DATED : August 20, 1985
INVENTOR(S) : John J. Augsburger, R. Keith Darlington It is certified that error appears in the above-identified patent and that said Letters Patent are hereby corrected as shown below:

On the cover page, line (73) insert:

-- Assignee: NL Industries, Inc., New York, N.Y. --.

Signed and Sealed this

Eleventh Day of November, 1986

Attest:

DONALD J. QUIGG

Attesting Officer

Commissioner of Patents and Trademarks